(12) United States Patent
Aubin et al.

(10) Patent No.: US 11,436,374 B2
(45) Date of Patent: Sep. 6, 2022

(54) BIOMETRIC-SECURED NON-BIOMETRIC APPLICATIONS ON A CARD

(71) Applicant: IDEMIA France, Courbevoie (FR)

(72) Inventors: Yann-Loïc Aubin, Courbevoie (FR); Simon Vaquier, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 295 days.

(21) Appl. No.: 16/662,088

(22) Filed: Oct. 24, 2019

(65) Prior Publication Data
US 2020/0134214 A1    Apr. 30, 2020

(30) Foreign Application Priority Data

Oct. 26, 2018  (EP) .................................... 18306399

(51) Int. Cl.
| | |
|---|---|
| *G06F 21/00* | (2013.01) |
| *G06F 21/62* | (2013.01) |
| *G06F 3/0482* | (2013.01) |
| *G06F 21/32* | (2013.01) |
| *G06K 19/073* | (2006.01) |
| *G06F 21/41* | (2013.01) |

(Continued)

(52) U.S. Cl.
CPC .......... *G06F 21/629* (2013.01); *G06F 3/0482* (2013.01); *G06F 21/32* (2013.01); *G06F 21/34* (2013.01); *G06F 21/41* (2013.01); *G06K 19/07354* (2013.01); *H04L 29/06802* (2013.01); *H04L 29/06809* (2013.01)

(58) Field of Classification Search
CPC ........ G06F 21/629; G06F 21/41; G06F 21/34; G06F 3/0482; G06F 21/32; G06F 21/30; H04L 29/06809; H04L 29/06802; H04L 63/08; H04L 9/32; G06K 19/07354; H04W 12/06
See application file for complete search history.

(56) References Cited

U.S. PATENT DOCUMENTS

2006/0091223 A1   5/2006 Zellner et al.
2009/0106558 A1 *  4/2009 Delgrosso .............. G06F 21/41
                                                    713/184

(Continued)

OTHER PUBLICATIONS

European Search Report, dated Mar. 21, 2019, from corresponding European patent application No. 18 30 6399.

*Primary Examiner* — Jeffrey C Pwu
*Assistant Examiner* — William A Corum, Jr.
(74) *Attorney, Agent, or Firm* — Nixon & Vanderhye

(57) ABSTRACT

A card includes a secure element hosting applications instances. An external interface receive, from an external card reader, an application selection command selecting one application instance from a set of one or more selectable application instances. A biometric interface is configured to acquire biometrics of a user via biometric sensor. A processor compares the acquired biometric data to reference biometric data stored in the card and set the selectable application instance set depending on the outcome of the biometric data comparison. An instance of a non-biometric application is provided in the set only in case of positive comparison. A non-biometric application is thus now biometric-secured. Personalized parameters configuring the instance of a same application may be determined based on the acquired biometrics, allowing configurations of the card to be proposed for several different users.

13 Claims, 8 Drawing Sheets

(51) Int. Cl.
*G06F 21/34* (2013.01)
*H04L 9/40* (2022.01)

(56) References Cited

U.S. PATENT DOCUMENTS

| | | | |
|---|---|---|---|
| 2015/0020191 A1* | 1/2015 | Vida | G06F 9/451 |
| | | | 726/17 |
| 2016/0203349 A1 | 7/2016 | Giobbi | |
| 2016/0267486 A1* | 9/2016 | Mitra | H04W 12/041 |
| 2016/0306997 A1 | 10/2016 | Spodak et al. | |
| 2018/0189767 A1* | 7/2018 | Bigioi | G06Q 20/204 |
| 2019/0303549 A1* | 10/2019 | Tanabe | G06F 21/32 |
| 2020/0356968 A1* | 11/2020 | Lemaire | G06Q 20/409 |
| 2021/0056556 A1* | 2/2021 | Matsunaga | G06F 21/6218 |

\* cited by examiner

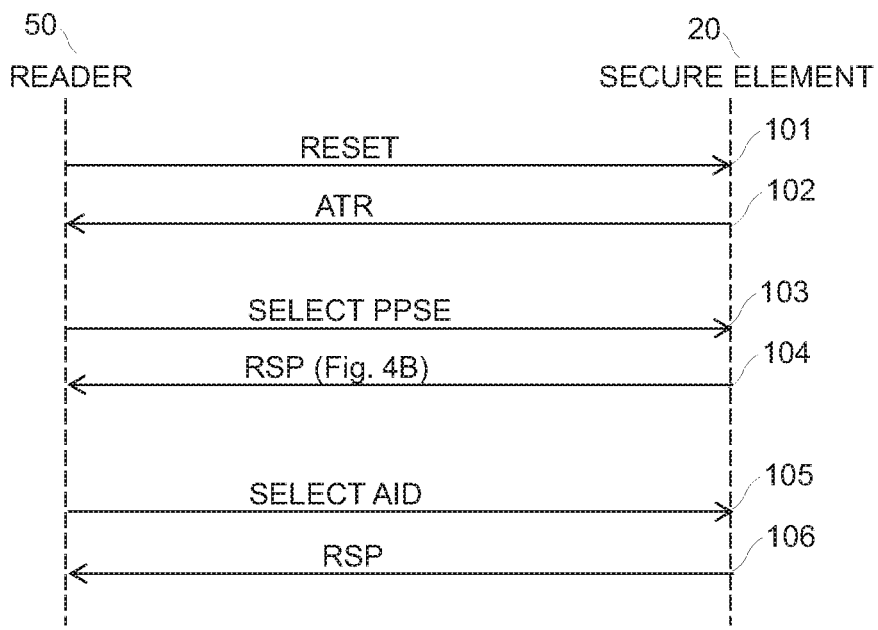

User Configuration Bytes
| # | PSE | PPSE |
|---|-----|------|
| 1 | 1 | 1 |
| 2 | 2 | 2 |
| 3 | 3 | 0 |
| 4 | 0 | 0 |
| 5 | 0 | 0 |
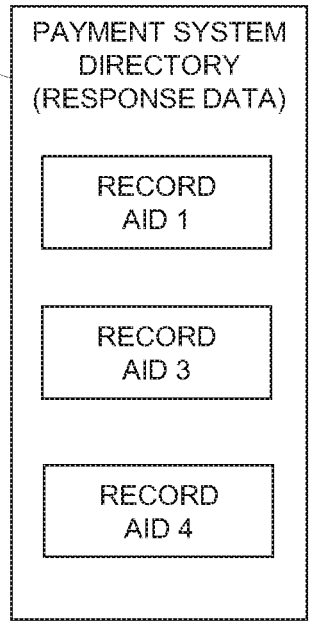
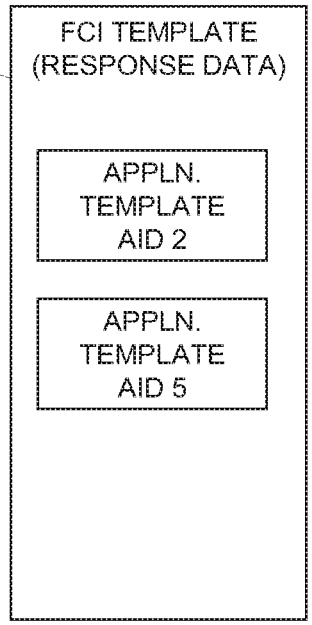
Fig. 5

BIOMETRIC-SECURED NON-BIOMETRIC APPLICATIONS ON A CARD

FIELD OF THE INVENTION

The present invention regards the securing of applications on a card, typically in the process of selecting applications on the card.

BACKGROUND

Integrated circuit cards (ICC), or chip cards, are in widespread use. Chip cards (also known as smart cards) typically support a contact interface in which an electrical connection is made between an external reader and conductive pads on the surface of the chip card, or a contactless interface in which a wireless (near field communication) connection is made between an external reader and an antenna within the chip card. Any reading of data from the card, or writing of data to the chip card, is performed via the contact interface or the contactless interface. Conventionally, it has been necessary for the chip card to be connected to a terminal having a card reader before a user can make any changes to the chip card, and any changes are made by the user interacting with the terminal and communication between the card reader and the chip card.

More recently, chip cards have been developed with biometric sensors, such as a fingerprint sensor. One function of this kind of card is to allow one biometric application to grant access to some services only in case of positive biometric authentication. This has security benefits.

There is some cost concern that non-biometric applications need to be modified to include biometric functionality, in order to efficiently operate in such biometric chip cards.

The present invention seeks to overcome the foregoing limitations.

SUMMARY

An aspect of the invention provides a card hosting a plurality of application instances and comprising:
- a first external interface configured to receive, from an external card reader, an application selection command selecting one application instance from a set of one or more selectable application instances;
- a second external interface or an internal biometric interface, either interface being configured to acquire biometric data (via an embedded biometric sensor or a biometric sensor external to the card); and
- a processor configured to compare the acquired biometric data to reference biometric data stored in the card; and to set the selectable application instance set depending on the outcome of the biometric data comparison.

In case of positive biometric data comparison, the selectable application instance set may comprise an instance of a non-biometric application, i.e. an application which is not natively secured by biometric measurements. No instance of the same non-biometric application may thus be made available for selection (i.e. visible) in case of negative comparison, for security reasons.

The selectable application instance set may comprise an instance of an application configured with personalized parameters, wherein the personalized parameters for configuration depend on the outcome of the biometric data comparison. Different instances (or configurations) of the same application can then be provided for the same card, depending on the biometric comparison. This identifies various modes for various users or various functionalities wished by a user.

The personalized parameters for configuration of the application instance may be selected from one of the following sets:
- in case of negative biometric data comparison, requesting a personal code (e.g. a PIN code) to a user to perform a function of the application instance, or not requesting such a personal code in case of positive biometric data comparison;
- in case of negative biometric data comparison, restricting a function of the application instance (e.g. limiting a maximum amount for payment or forcing a currency), or not restricting such function in case of positive biometric data comparison;
- personal parameters (e.g. bank account or transport account or access rights) associated with reference biometric data matching the acquired biometric data.

The application may be instantiated with the personalized parameters in response to the biometric data comparison or the application selection command reception.

The selectable application instance set may comprise an instance of a biometric application in case of positive biometric data comparison, and possibly also in case of negative biometric data comparison.

Comparing the acquired biometric data to reference biometric data may comprise for the processor to compare the acquired biometric data to respectively a plurality of reference biometric data sets, each set being associated with a predefined selectable application instance set for selection as the selectable application instance set depending on the outcome of the biometric data comparison.

The plurality of reference biometric data sets may correspond to a respective plurality of users, or to a respective plurality of biometric parts (finger, iris . . . ) of the same user, or to a respective plurality of biometric parts of each of two or more users.

The processor may be configured to obtain an indication of one reference biometric data set matching the acquired biometric data and to store the reference set indication in memory.

The processor may be configured to allow or disallow the selection of application instances by the application selection command, based on the reference set indication and the predefined selectable application instance sets.

The processor may be configured to store the outcome of the biometric data comparison or the acquired biometric data for use during the execution of the selected application instance.

The processor may be configured to send, responsive to receiving an interrogation by the external card reader, a list of application identifiers assigned to the application instances of the selectable application instance set.

The first external interface may be the second external interface.

Another aspect of the invention provides a method of operating a card hosting a plurality of application instances, the method comprising:
- receiving, from an external card reader, an application selection command selecting one application instance from a set of one or more selectable application instances,
- acquiring biometric data from an external interface or an internal biometric interface, and
- comparing the acquired biometric data to reference biometric data stored in the card, wherein the selectable application instance set is set depending on the outcome of the biometric data comparison.

The method may include optional features, for instance those set forth above from the card perspective.

A card in accordance with an example of the present disclosure can allow an unmodified non-biometric application to be secured with biometric-based selection, without any need to include biometric features in the application itself. For instance the non-biometric application may be made available in the selectable application instance set (i.e. visible and selectable by the external card reader) only in case of positive biometric data comparison (i.e. biometrics recognized or confirmed). It turns that an execution of this application can be forbidden or degraded when wrong biometric data are acquired, thereby securing the application. Advantageously, any biometrics-free application created by third parties can be loaded in the card with a possibility to secure its execution based on biometrics.

In an example where the card has both contact interface and contactless interface, the present invention allows the Payment System Environment (PSE—for contact payment) and Proximity Payment System Environment (PPSE—for contactless payment) to change the list of the application identifiers (AIDs—assigned to the application instances) selectable on the card in their responses, depending on the acquired biometrics.

An advantage of at least one example is that various (personalized) configurations of the same applications can be dynamically made available to the external card reader, responsive to the user identified through the biometric data or to a functionality indication represented by a user part (e.g. finger, iris, and so on) identified through the biometric data. For instance, less secured executions of an application may be provided when the biometric data comparison is positive (since the biometrics already guarantee a first level of securing). As an example, a payment application may require the user to enter a PIN code for payment validation in case the biometric data comparison is negative, while no PIN code is requested when the comparison is positive, the securing relying on the recognized biometrics. Also different maximum payment amounts can be set in payment applications for different users.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described or claimed methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIG. 3D shows an example of correspondence data which maps between the operating modes of the card and response data;

FIG. 4A shows communication between an external card reader and a card under a Proximity Payment System Environment (PPSE);

FIG. 4B shows a data structure sent to the card reader under PPSE;

FIG. 5 shows another example of correspondence data and response data;

DETAILED DESCRIPTION

Figure 1:
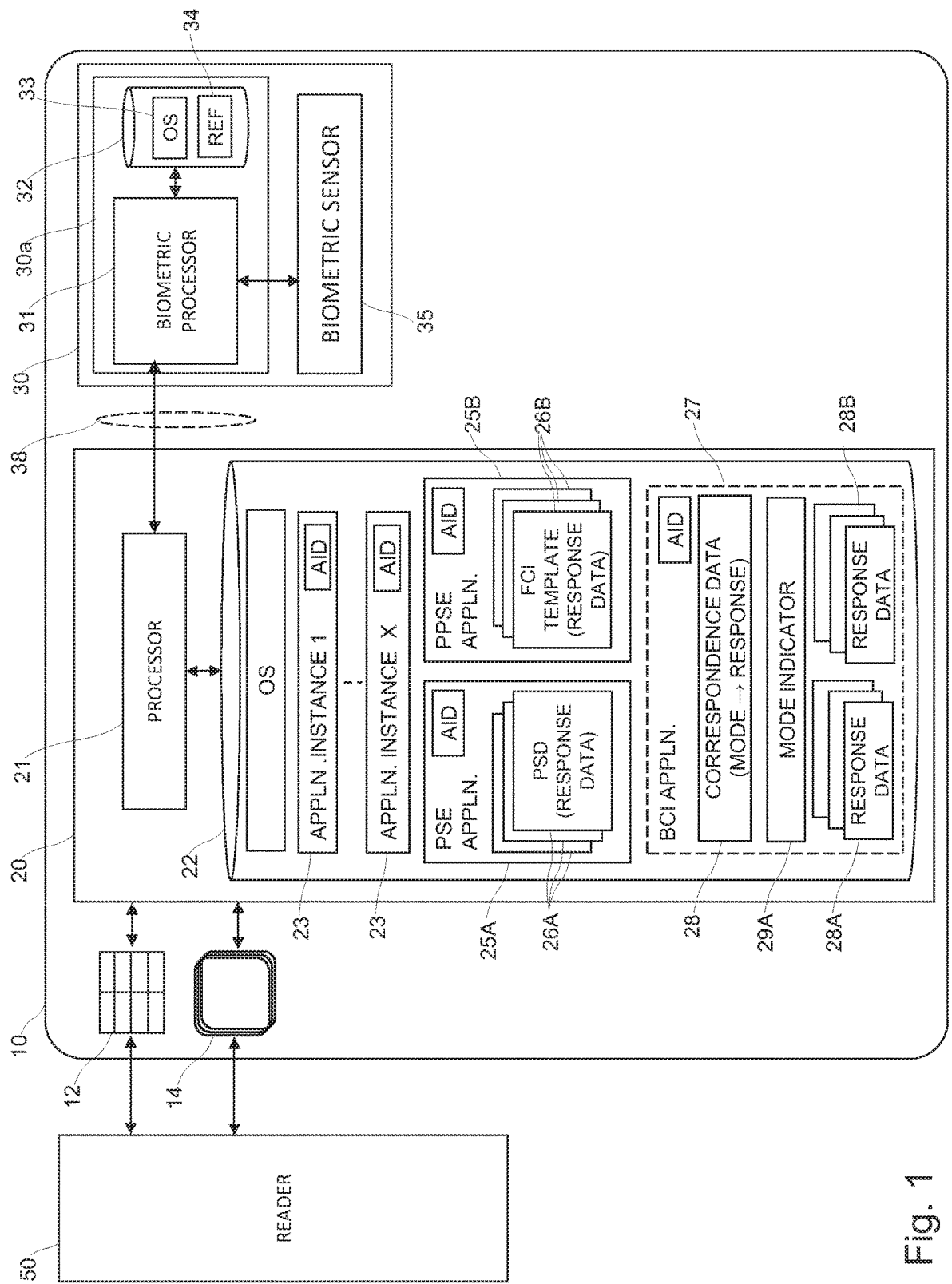
FIG. 1 schematically shows a card with a secure element and a user interface.

FIG. 1 schematically shows an example of an integrated circuit card (ICC) 10, or chip card, with a user interface. The chip card 10 comprises a secure element 20 and a biometric interface section 30. The biometric interface section 30 can be in the form of a separate circuitry card which is housed within the body of the card 10. In this example the biometric interface section 30 comprises a biometric interface or unit 30a which is operatively connected to one or more biometric sensors 35. Exemplary biometric sensors include fingerprint sensors, iris sensors, facial recognition sensors, electrocardiogram sensors, and so on. The biometric interface section 30 may alternatively be called a biometric card. An internal interface 38 is provided between the biometric interface section 30 and the secure element 20. In a preferred arrangement, the biometric interface section 30 also comprises a battery (not shown). The battery can allow the card to function when the card is not powered via an external card reader 50. In a variant (not shown), the biometric sensor or sensors 35 are provided by the external card reader 50, in which case the biometric interface or unit 30a is connected to the biometric sensors through an external interface 12, 14 of the card. In another variant (not shown), the biometric interface section 30 is provided by an external device (for example, the external card reader 50), in which case the biometric interface section 30 is connected to the secure element 20 through an external interface 12,14.

The secure element 20 comprises a processor 21 and storage 22. The secure element 20 is connected to at least one external interface 12, 14 for communicating with an external card reader 50. The external interface may be a contact interface 12 or a contactless interface 14. The secure element 20 may be provided with just a contact interface 12 or just a contactless interface 14, or the secure element 20 may be provided with both a contact interface 12 and a contactless interface 14. Communication between the card 10 and the external card reader 50 may be authenticated, or the communication may not be authenticated.

Communication between the secure element 20 and the biometric interface section 30 via the internal interface 38 can also be in the form of ISO 7816 Application Protocol Data Units (APDU). In effect, the biometric interface section 30 operates as a specialised card reader integrated into the card 10.

The biometric interface processor 31 executes an operating system 33. The operating system 33 allows biometrics of users of the card 10 to be acquired by the biometric sensor 35. The card may support a total of M operating modes depending on the acquired biometrics, where M is an integer greater than or equal to 2 (one can be a default mode as introduced below). Reference biometrics data 34 corresponding to one or more users and/or to one or more user parts (e.g. fingers) are stored in memory 32 of the biometric interface section 30, for comparison purposes with acquired biometrics. Each set of reference biometric data 34 is associated with one of the operating modes. For security reasons, the reference biometrics data 34 and the association data may be stored in the secure element 20.

By associating the operating modes with reference biometric data 34, it is possible to define user profiles made of certain application instances per each user or per user type as described below. Also, it is possible to define functional profiles made of certain application instances that a user can indifferently select using for instance the biometrics of various parts (e.g. fingers) of himself.

Each of the M operating modes can correspond to a respective number N of application instances 23 hosted by the secure element 20, where N is an integer, and N≥0. An application instance corresponds to a given application configured with specific personalized parameters. Each application instance has its own application identifier (AID) as defined in the ISO/IEC 7816-5 standard. The AID may have a length between five bytes (short AID) and sixteen bytes (long AID made of the short AID plus optional bytes). Various instances of the same application may have the same short AID and different values for the optional bytes.

The application instances may be created in advance in memory. Alternatively, applications are stored in memory and personalized parameters (defining configurations) are stored in memory in association with the various operating modes (or reference biometric data). In that case, the application instances may be created dynamically from the stored applications and the stored personalized parameters corresponding to the acquired biometrics. The dynamic instantiation may occur responsive to acquiring the biometric data or responsive to receiving a SELECT AID command as introduced below. This approach aims at saving memory use in the card.

In a simplest case, a default operating mode can correspond to wrong or unknown acquired biometrics and can correspond to a number $N_{DEF}$ of application instances for use by default, while a personal operating mode can correspond to successful acquired user biometrics and can correspond to a number $N_{USER}$ of application instances personalized to the user. For example: the default operating mode may make available an instance of a debit (i.e. payment) application which requires the user to enter its PIN code (and optionally make available other applications); the personal operating mode may make available an instance of the same debit application which does not require the PIN code to be entered (and optionally other applications). In another example (which may be combined), the default operating mode may make available an instance of the debit application with a defined maximum amount that can be debited (e.g. 20 €); the personal operating mode may make available an instance of the same debit application with a higher maximum amount or without amount ceiling. Advantageously, the instances of the debit application can be selected by the external card reader 50 using the short AID, regardless of the current operating mode, as only one of them is available for this current mode.

In another case, various personal operating modes can correspond to various users identified by acquired biometrics and can correspond to respective numbers $N_{USER}$ of application instances personalized to the corresponding identified users. In a variant, instead of identifying individually the users, the acquired biometrics may be used to classify them (e.g. kids vs. adults, students vs. teachers, . . . ) so that the personal operating modes correspond to various user classes. A default operating mode may optionally supplement the various personal operating modes in case of unsuccessful user/class identification from the acquired biometrics. For example: each personal operating mode may make available an instance of the same debit application configured with the bank account of the corresponding user or a maximum debit amount for the user, and/or an instance of the same transport application configured with the transport account of the corresponding user, and/or an instance of the same access application (to access a building, a computer, and so on) configured with the access rights granted to the corresponding user. This case advantageously allows a single card to be used by all the members of the same family (or group). All or part of the application instances may be configured per user or all or part of the application instances may be configured per user class, or both.

In yet another case, various personal operating modes can correspond to various functionalities offered to a user depending on user parts identified by the acquired biometrics. The various functionalities may rely on providing instances of the same application to the personal operating modes, but with dedicated (and different) personalized parameters. A default operating mode may optionally supplement the various personal operating modes in case of unsuccessful user part identification from the acquired biometrics. For example: personal operating modes can be associated with two or more fingers of a user respectively. A first personal operating mode, activated when a left thumb (or any other finger) is detected through acquired biometrics, may make available instances of certain applications, while other personal operating modes, activated when other fingers are detected, may make available other instances of the same or other applications. For instance, the thumb provides application instances operating in Euros only, while the first finger provides application instance operating in Dollars only (and so on).

In yet another case mixing the two previous cases, personal operating modes can correspond to respective pairs of user (or class) and user part. For instance, the left thumb of a kid may trigger a personal operating mode different from a mode triggered by another finger of a kid and from a mode triggered by any finger of an adult.

An instance of a non-biometric application may also be provided only in the personal operating mode and not in a default operating mode activated upon unsuccessful recognition of acquired biometrics.

More generally:
- the personal operating mode or modes may include instances of one or more biometric-based applications while the default operating mode (unsuccessful recognition of acquired biometrics) does not include the same instances (or any instance) of these applications, and/or
- the personal operating mode or modes may include instances of one or more non biometric applications while the default operating mode (unsuccessful recognition of acquired biometrics) does not include the same instances (or any instance) of these applications, and/or both the personal operating modes and the default operating mode may include the same instance or instances of one or more applications, be them non biometric and/or biometric-based applications.

Other cases may provide instances of (biometric-based or non-biometric) applications for the default operating mode, while the same instances are not provided for the personal operating modes.

The secure element 20 can store a plurality of application instances 23 which may be instances of the same application or of various applications. FIG. 1 shows X application instances, where X is an integer. Each application instance may be Europay, MasterCard, and Visa (EMV) compliant. Each application instance has an Application Identifier (AID). The secure element 20 also stores a Payment System Environment (PSE) application 25A, a Proximity Payment System Environment (PPSE) application 25B, and a Biometric Card Interface (BCI) Application 27.

PSE and PPSE applications are dedicated to payment functions. The present invention is of course not limited to such type of functions and may provide or combine other functions. For instance, applications 25A, 25B (or other applications provided) can be compliant with other standards such as the Cipurse standard published by OSPT alliance. A Cipurse application may for instance be named PXSE.

PSE is defined in "EMV® Integrated Circuit Card Specifications for Payment Systems Book 1 Application Independent ICC to Terminal Interface Requirements", published by EMVCo. PPSE is defined in "EMV® Contactless Specifications for Payment Systems Book B Entry Point Specification", published by EMVCo. The PSE application 25A is an entry point for an external card reader 50 when the card is interrogated via the contact external interface 12. The PSE application 25A comprises a data structure 26A. This data structure 26A comprises information about application instances supported by the card, which can be sent to the external card reader 50. It is usually a list of such application instances, and is called a Payment System Directory (PSD) under PSE. The data structure 26A to send to the external card reader takes different values depending on the operating mode. In a first embodiment, a plurality of data structures 26A is provided in the PSE application 25A, each data structure being associated with one of the operating mode. Only one of the data structures 26A can be activated at a given time, the one corresponding to the acquired biometrics (through the associated operating mode). In a second embodiment, a single active data structure 26A is provided in the PSE application 25A, the content of which is updated dynamically as explained below, using response data 28A stored in the BCI Application 27. In the first and second embodiments, the active data structure 26A finally comprises the supported applications instances corresponding to the operating mode enabled by the acquired biometrics.

Similarly, the PPSE application 25B is an entry point for an external card reader 50 when the card is interrogated via the contactless external interface 14. The PPSE application 25B comprises a data structure 26B. This data structure 26B comprises information (e.g. a list) about application instances supported by the card, which can be sent to the external card reader 50. It is usually a list of such application instances, and is called a File Control Information (FCI) template under PPSE. The data structure 26B to send to the external card reader takes different values depending on the operating mode. As for the PSE application 25A, one data structure from a plurality of provided data structures 26B may be activated based on the acquired biometrics, or the content of the sole data structure 26B is dynamically updated based on the acquired biometrics, using response data 28B stored in the BCI Application 27.

This data structure 26B is also updated dynamically as explained below with the supported applications instances based on the operating mode enabled by the acquired biometrics.

In this specification, the general term "response data" is used to represent stored data about application instances which may be sent to an external card reader 50, for instance a list of application instances that are available for selection by the external card reader 50.

The secure element 20 stores a mode indicator 29A. The mode indicator 29A is indicative of an operating mode selected through the biometric measures acquired by the biometric interface section 30.

In the first embodiment, the secure element 20 also stores correspondence data 28 to activate the appropriate data structure 26A, 26B depending on the acquired biometrics, from the set of data structures provided in the PSE and PPSE Applications. In the second embodiment, the secure element 20 stores various sets of response data 28A, 28B and correspondence data 28 to dynamically fill the data structures 26A, 26B depending on the acquired biometrics.

Each data structure 26A (first embodiment) or set of response data 28A (second embodiment) is associated with a given operating mode and defines information (e.g. a list of AIDs) about application instances supported by the card. Similarly, each data structure 26B (first embodiment) or set of response data 28B (second embodiment) is associated with a given operating mode and defines information (e.g. a list of AIDs) about application instances supported by the card. Each data structure or set of response data may be stored as a table of AIDs (uniquely identifying the supported application instances 23), and being uniquely identified by a table identifier TID.

The correspondence data 28 indicates, for each of the operating modes, a correspondence (mapping) between the operating mode and the data structures 26A, 26B (first embodiment) or response data 28A, 28B (second embodiment) which should be used to form the active data structures 26A, 26B with a view of being sent to a card reader when the secure element 20 is interrogated for information about applications supported by the card. The correspondence data 28 may map the TID of each data structure or response data to an identifier of the associated operating mode. A first table may store the correspondence data 28 related to the data structure 26A/response data 28A for the PSE. A separate table may store the correspondence data 28 related to the data structure 26B/response data 28B for PPSE.

The mode indicator 29A and the correspondence data 28 may be stored within a functional block 27 which will be called a biometric interface Application 27, or Biometric Card Interface (BCI) Application 27. The BCI Application 27 has an Application Identifier (AID) which is different from the AIDs of other application instances on the secure element 20. The biometric interface processor 31 can communicate with the BCI Application 27 by sending an APDU with the AID of the BCI Application 27. The BCI Application 27 is preferably executed by default in the card upon starting up/powering up the card 10.

Figure 2:
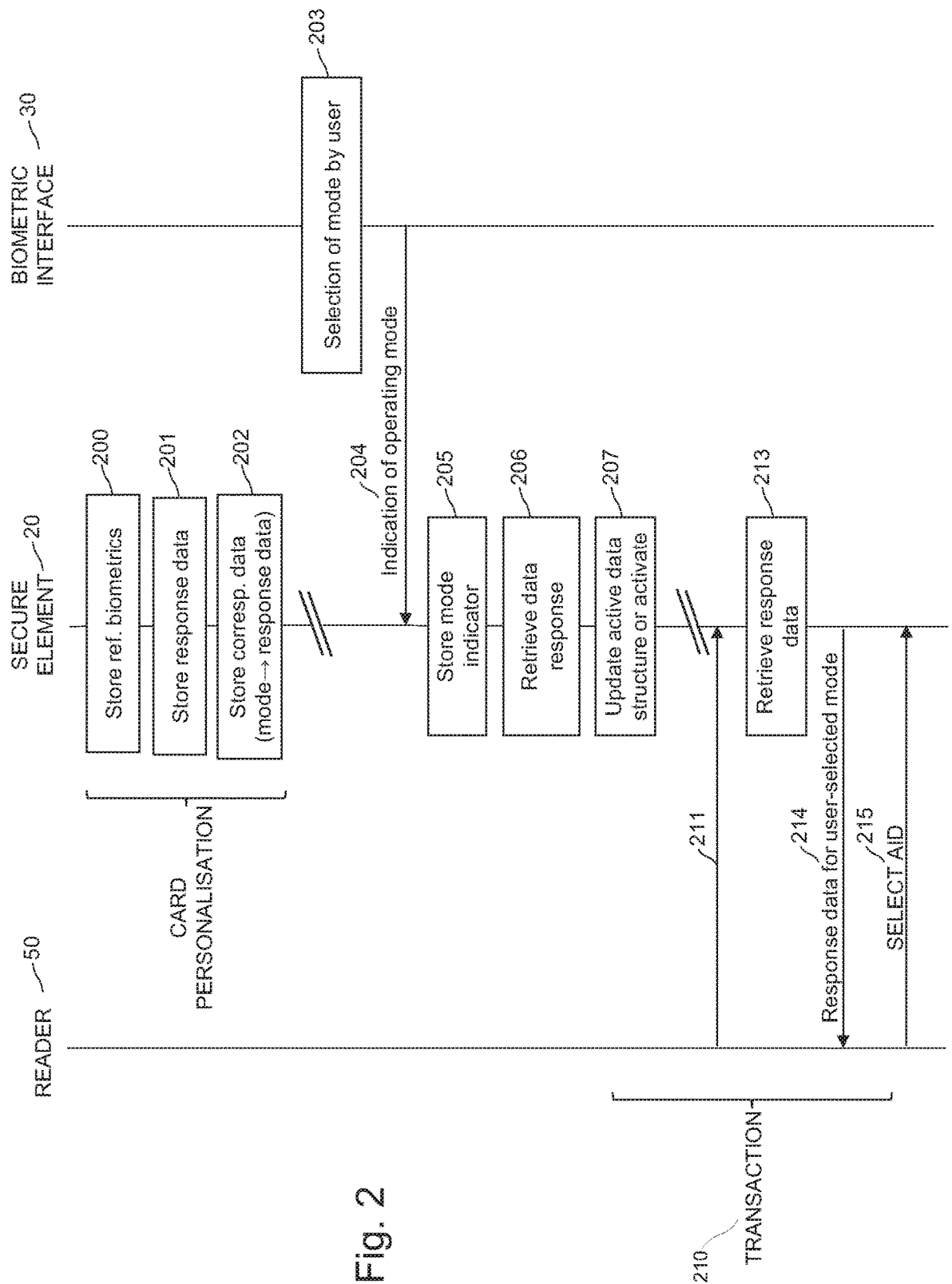
FIG. 2 shows operation of the card.

FIG. 2 shows a method of operating a card. The entities shown in FIG. 2 are: the secure element 20 and the biometric interface section 30 of the card 10, and an external reader 50. The method allows a user to select one of the plurality of operating modes or one operating mode to be selected based on the user thanks to its acquired biometrics. Each of the operating modes is associated with a number N of application instances which are available for use in that mode. After the card has been read it is necessary for the user or another user to re-select an application instance, be it different or not, via the biometric interface section 30.

The method comprises storing reference biometric data 34 and corresponding association data (to link to the various operating modes) at block 200, storing sets of data structures 26A, 26B (first embodiment) or response data 28A, 28B (second embodiment) at block 201 and storing correspondence data 28 at block 202. The response data and correspondence data, and optionally the reference biometric data 34, are stored at the secure element 20. The reference biometric data 34 may also be stored at the biometric interface section 30. Blocks 200, 201 and 202 can be performed during a card personalisation stage before the card is issued to a user or a group of users (e.g. a family) The remaining blocks 203-215 are performed during use of the card. Blocks 203-215 can be performed repeatedly.

At block 203 a user interacts with the biometric interface section 30 by acquiring biometric data using the biometric sensor 35, to select an operating mode. For instance, a fingerprint, an iris, a face image can be acquired. Basically, block 203 includes comparing the acquired biometrics with the reference biometric data 34 to find an associated operating mode. The biometric interface 30 sends an indication 204 of the operating mode to the secure element 20. This communication can be in the form of an ISO 7816 APDU which carries the AID of the BCI Application 27. At block 205 the secure element stores a mode indicator. The mode indicator indicates the mode selected at the biometric interface. In one example, the mode indicator stored at block 205 is the data element 204 received from the biometric interface 30. In another example, the mode indicator stored at block 205 is different to the data element 204 received from the biometric interface, but still is indicative of the operating mode inferred from the acquired biometrics of the user.

In a variant where the reference biometric data 34 are stored in the secure element 20, the data element 204 may comprise the acquired biometric data or a signature or hash thereof. In that case, the processor 21 compares the acquired biometric data (or signature or hash) of the data element 204 with the reference biometric data 34 (or its signature or hash) in order to determine the operating mode (associated with the matching reference biometric data). An identifier of this operating mode is stored in the mode indicator 29A.

At optional block 206, responsive to a new mode indicator 29A, data structure 26A, 26B (first embodiment above) or response data 28A, 28B (second embodiment above) corresponding to the new mode indicator 29A are identified or retrieved from memory using the correspondence data 28. Next, at block 207, the identified data structures 26A, 26B are activated (first embodiment) or the active data structures 26A, 26B are updated by the retrieved response data 28A, 28B (second embodiment). For instance, the retrieved response data 28A, 28B are overwritten on the active data structure 26A, 26B (i.e. replace the previous data). Blocks 206 and 207 are optional because the retrieval of the response data may be performed only when needed, at step 213 described below. This avoids having steps 206, 207 be performed each time the operating mode is changed and no subsequent transaction 210 is performed.

Subsequently, the card is presented to an external reader 50 and the reader 50 communicates with the card 10. The communication between the reader and the card is a transaction 210. Usually, communication between the reader and the card is in the form of pairs of command and response messages: a command sent by the reader 50 to the card 10 followed by a response sent from the card 10 to the reader 50. A command-response pair is shown as 211, 214.

At block 213 the secure element retrieves response data when it receives a command 211 from the reader. This may be the active data structure 26A in case of contact payment (PSE) or the active data structure 26B in case of contactless payment (PPSE) as they result from block 207. Alternatively, the response data can be directly retrieved from among the sets of data structures 26A, 26B (first embodiment) or response data 28A, 28B (second embodiment), using the correspondence data 28 and the mode indicator 29A. At block 214 the secure element sends the retrieved data to the reader 50. The external reader is thus aware of the application instances supported by the card for the current operating mode.

In use, the external reader 50 can then select one of the application instances using a conventional SELECT AID command 215, i.e. a SELECT command specifying the AID of the targeted application instance. Of course, the external reader 50 should choose one AID from the list of AIDs received in response data 214. The processing of the received SELECT AID command by the card is well-known as well as the subsequent steps (therefore not shown in the Figure).

For instance, the secure element checks that the AID specified in the received command is included in the active data structure 26A or 26B concerned by the (contact or contactless) interface used. The selection of an application instance which does not belong to the list (i.e. is not selectable) is then refused.

In the course of execution of the selected application instance, the already acquired biometrics may be used again, for instance if it is a biometric-based application, or new biometrics may be acquired using the same biometric sensor or another one.

In embodiments, the selected application instance is dynamically instantiated responsive to receiving the SELECT command with the associated AID. This means a definition of the application instance (application and personalized parameters) is stored in memory in association with the AID, and only when a SELECT AID is received, the processor 21 instantiates the application with the associated personalized parameters. This approach reduces memory consumption.

Figures 3A, 3B, 3C:
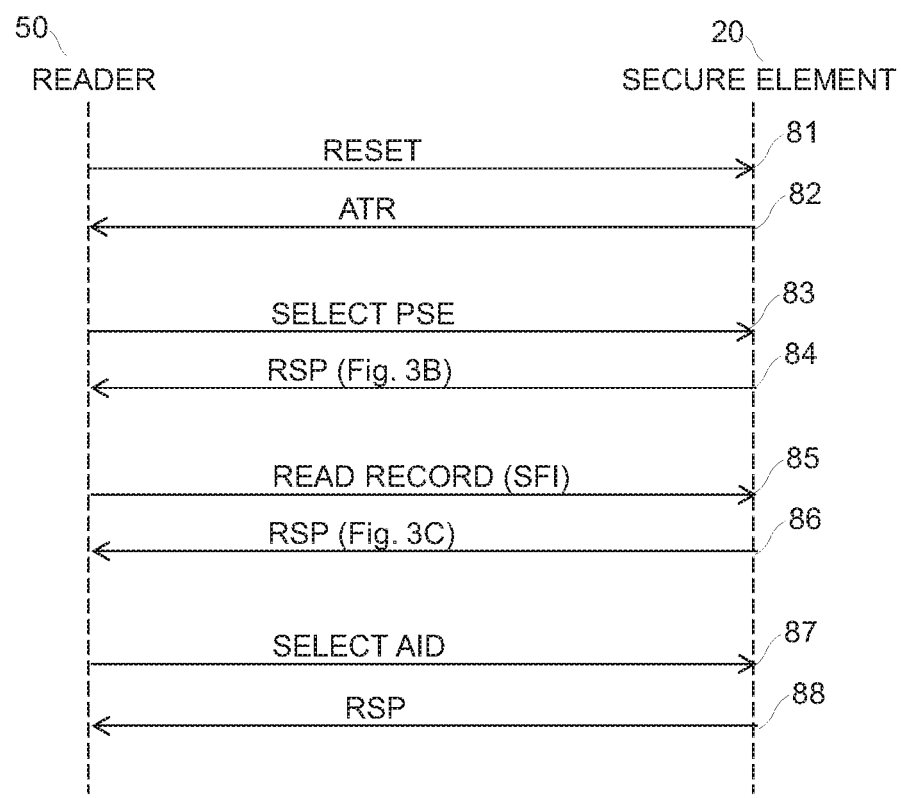
FIG. 3A shows communication between an external card reader and a card under a Payment System Environment (PSE)
FIG. 3B shows a data structure sent to the card reader under PSE.
FIG. 3C shows a data record forming part of a payment system directory.

A brief overview will be provided of conventional operation between an external reader and a card before describing examples of the present disclosure. FIG. 3A is a sequence diagram illustrating selection of an EMV application under a Payment System Environment (PSE). When a chip card is presented to a card reader 50, a communication exchange begins between the card reader 50 and the secure element 20 of the card 10. An EMV transaction begins with a Reset/ATR pair 81, 82 followed by a SELECT/RSP pair 83, 84. The EMV selection procedure begins by building a list of candidate application instances. In order to do this, the card reader 50 fetches application identifiers (AIDs) from particular files or data structures stored on the card 10. Each AID is associated with a given priority. Once the list of AIDs supported by the card 10 is established, the reader 50 selects the application instance supported by the reader 50 that has the highest priority. The return value to the first SELECT command 83, sent in response 84, includes the data structure shown in FIG. 3B. This data structure indicates the file 91 to read in order to find the identifiers of the application instances supported by the card. This file is known as the "Payment System Directory". The conventional procedure is to read all the records in the Payment System Directory. One record is shown in FIG. 3C. The reader will choose the record with the highest application priority indicator 93 of the application instances that the reader supports.

This procedure is modified in accordance with an example of the present disclosure. The biometrics acquired by the biometric sensor drive the selection of the application instance to use when the card is interrogated by an external reader 50. For instance, different application instances may be used for different users or types of user. Also a user can select an application instance which he wishes to use, by acquiring biometrics of one or another part (e.g. finger) of himself. The BCI application 27 stores an indication 29A of the operating mode associated with the acquired biometrics. The procedure for communicating between an external card reader 50 and the card 10 is the same as shown in FIG. 3A up to the point where the card reader 50 sends the READ RECORD command 85. At this point the procedure is modified. Logic at the secure element 20 checks the operating mode inferred from the acquired biometrics and modifies the data to be retrieved by the READ RECORD command based on the mode, as follows:

```
mode = current operating mode from functional block 27;
if mode == 0
    card behaves as a standard EMV card;
else {
    n = get-configuration-byte;
    READ RECORD n from Payment System Directory;
}
```

If the mode=0, the READ RECORD command operates in a conventional manner It retrieves and sends default records of the entire Payment System Directory to the card reader 50. If the mode=1, 2, . . . N, the READ RECORD command does not retrieve the entire Payment System Directory but, instead, retrieves a particular record (e.g. one of the sets of data structures 26A or of data response 28A of FIG. 1) within the Payment System Directory or a dedicated memory. FIG. 3D shows an example of a table of correspondence data 28 which maps the operating modes of the card with response data. The function "get-configuration-byte" performs a look-up in the table 28. The look-up location is the column "PSE" and the row corresponding to the value of the current operating mode. The returned value from the cell of table 28 specifies the record 26A or 28A in the Payment System Directory or dedicated memory that should be sent to the card reader. The response 86 only includes that record of the Payment System Directory. The subsequent SELECT AID command 87 includes the AID of an application instance returned to the card reader at 86. In this way, the card reader 50 is forced to use the application instance or one of the application instances corresponding to the current operating mode (i.e. adapted to the user or selected by the user).

FIG. 4A is a sequence diagram to illustrate selection of an EMV application under a Proximity Payment System Environment (PPSE). When a chip card is presented to a card reader 50, a communication exchange begins between the card reader 50 and the secure element 20 of the card 10. An EMV transaction begins with a Reset/ATR pair 101, 102 followed by a SELECT/RSP pair 103, 104. The EMV selection procedure begins by building a list of candidate application instances. The list of applications supported by the card is contained directly in the response 104 to the SELECT PPSE command 103. The response is shown in FIG. 4B. The response includes application identifiers (AIDs) 96 of application instances supported by the card. Each AID is associated with a given priority. Once the list of AIDs supported by the card is established, the reader selects the application instance that is supported by the reader that has the highest priority.

This procedure is modified in accordance with an example of the present disclosure. The biometrics acquired by the biometric sensor drive the selection of the application instance to use when the card is interrogated by an external reader. For instance, different application instances may be used for different users or types of user. Also a user can select an application instance which he wishes to use, by acquiring biometrics of one or another part (e.g. finger) of himself. The BCI application 27 stores an indication 29A of the operating mode associated with the acquired biometrics. The procedure begins as shown in FIG. 4A with a RESET/ATR pair 101, 102. The SELECT PPSE is modified. Logic at the secure element 20 checks the operating mode inferred from the acquired biometrics and modifies the data to be retrieved by the SELECT PPSE command based on the mode, as follows:

```
mode = current operating mode from functional block 27;
if mode == 0
    card behaves as a standard EMV card;
else {
    n = get-configuration-byte;
    SELECT PPSE return modified FCI template;
}
```

As with PSE, the logic uses a table 28 of correspondence data shown in FIG. 3D. The function "get-configuration-byte" performs a look-up in the table 28. The look-up location is the column "PPSE" and the row corresponding to the value of the current operating mode. The cell maps to a FCI containing just one of the application templates 96 corresponding to the operating mode/application associated with the acquired biometrics (and thus maybe selected by the user). The value of the cell in table 28 can be an index (n) to the $n^{th}$ template in a set of templates (e.g. one of the sets of data structures 26B or of data response 28B of FIG. 1). The response 104 only includes that template from the total set of templates. The subsequent SELECT AID command 105 includes the AID of an application instance returned to the card reader at 104. In this way, the card reader 50 is forced to use the application instance or one of the applications instances corresponding to the current operating mode (i.e. adapted to the user or selected by the user).

An advantage of operating in this way is that the biometric interface section 30 is fully isolated from the details of the different payment system environments. The biometric interface section 30 interacts with a single functional block (the BCI application) 27 on the secure element 20. The mapping of the operating mode to a payment application instance is held in the BCI application 27, within the secure environment of the secure element 20. This arrangement means that there is no requirement for the biometric interface section 30 to hold any information about the particular payment application instances running on the secure element, such as the AID (application identifier) or cryptographic keys required in order to access payment application files. When new biometrics are acquired by the biometric sensor 35, there is no major change to data stored at the secure element, other than to store a new value of the mode selected by the user. The BCI application 27 points to existing data stored in the data structures 26A, 26B (first embodiment), the latter may be modified at step 207 responsive to each change of operating mode. In that case, the Payment System Directory 26A under PSE and the File Control Information template 26B under PPSE can be conventional.

In addition to the operating modes corresponding to reference biometric data 34, the card may have a default mode corresponding to non-matching acquired biometrics, e.g. mode=0, in which when the secure element is interrogated by the external card reader 50, the secure element 20 is configured to respond in a conventional manner and send the response data corresponding to all of the application instances supported by the card or to default application instances.

FIG. 5 shows another example of a table of correspondence data 28 which maps between the operating modes of the card and the response data 28A,28B or data structures 26A,26B. In this example there are three application instances available under PSE and two application instances available under PPSE. These application instances have corresponding records in the Payment System Directory 26A and FCI template 26B. There are three records in the Payment System Directory 26A. Each record stores a value of an AID corresponding to an application instance hosted by the card: record 1 stores a value of AID 1, record 2 stores a value of AID 3 and record 3 stores a value of AID 4. There are two application templates in the FCI template 26B. Each application template stores a value of an AID corresponding to an application instance hosted by the card: application template 1 stores a value of AID 2, application template 2 stores a value of AID 5.

The function "get-configuration-byte" performs a look-up in the table 28. The look-up location is the column "PSE" and the row corresponding to the value of the current operating mode. The returned value from the cell of table 28 specifies the record in the Payment System Directory that should be sent to the card reader. The response 86 only includes that record of the Payment System Directory. The subsequent SELECT AID command 87 includes the AID of the application returned to the card reader at 86. In this way, the card reader 50 is forced to use the application corresponding to the current operating mode.

Figure 6:
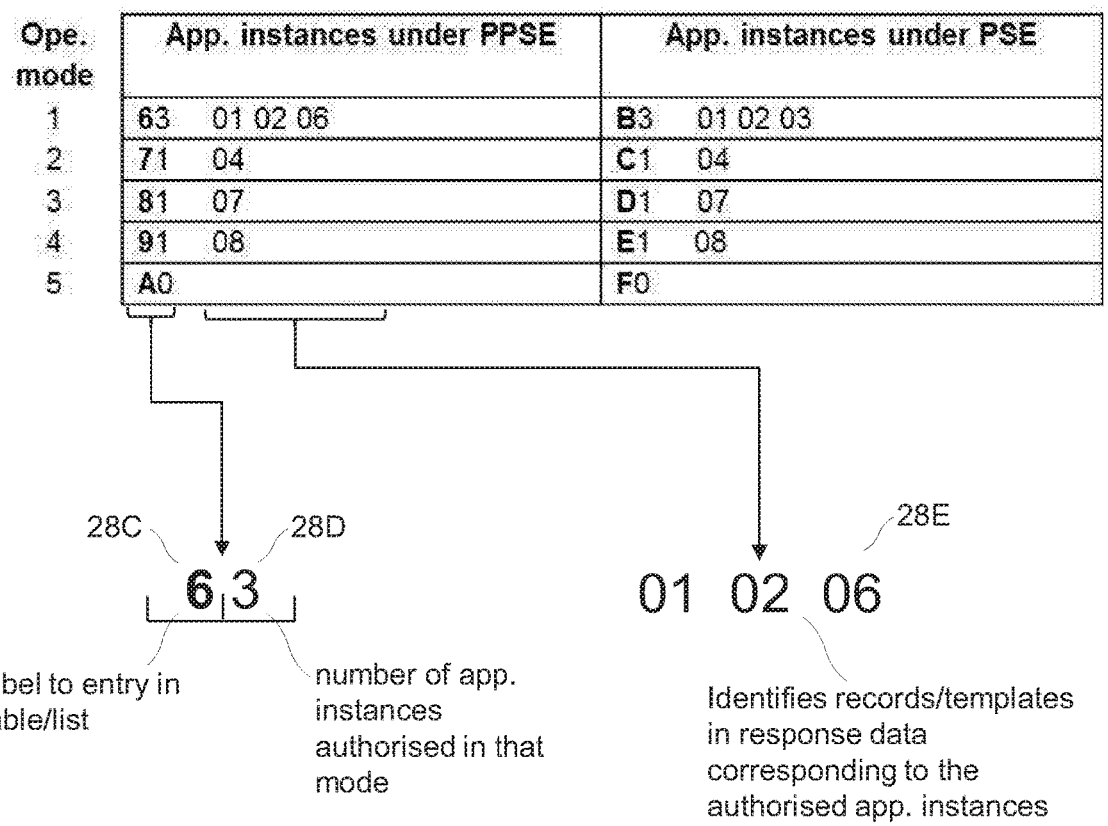
FIG. 6 shows another example of correspondence data.

FIG. 6 shows an example of correspondence data 28 which allows a plurality of application instances to be enabled. The data structure is similar to the data structure shown in FIG. 3D and FIG. 5. The data structure has an entry corresponding to each operating mode and each supported external interface (PPSE, PSE). Each entry in the data structure holds an index to an application instance, or a plurality of application instances, available under PPSE or PSE. In this example, in mode 1 there are three application instances under PPSE (records 1, 2 and 6) and three application instances under PSE (records 1, 2 and 3). The number of authorised application instances can be any value from 0 (e.g. mode 5 has no application instances enabled) to an upper limit.

Optionally, each entry in the data structure of correspondence data 28 can comprise an identifier 28D of the number of enabled application instances. In the example of FIG. 6, each entry in the data structure of correspondence data 28 comprises an identifier 28D of the number of application instances enabled for that operating mode, i.e. a number of records/templates to return to the external reader as response data. For example, mode 1 under PPSE has an identifier "3", indicating 3 application instances. The subsequent data 28E is a list of references to the records/templates for those application instances. In the same example, the records/templates are numbers 1, 2 and 6 in the set of response data. The order of the application identifiers 28E can indicate priority. A Priority indicator can be allocated to the records/templates (EMV Tag) equal to the order in the table of correspondence data 28. In this same example of mode 1 under PPSE, the application instances have the priority order: 1, 2, 6.

Optionally, each entry in the data structure of correspondence data 28 can comprise a label 28C (in hexadecimal) to that data structure entry. The label is unique within the data structure 28. The label 28C allows the data structure to be traversed (parsed) more quickly. In the example of FIG. 6, the entries corresponding to operating modes under PPSE are labelled: 6, 7, 8, 9, A, and the entries corresponding to operating modes under PSE are labelled: B, C, D, E, F. The PPSE label corresponding to an operating mode is determined by calculating: mode identifier+5. The PSE label corresponding to an operating mode is determined by calculating: mode identifier+10. For example, mode 2 under PPSE is:

PPSE_label=2+5=7 and mode 2 under PSE is:

PSE_label=2+10=C.

Conveniently, in the example of FIG. 6 the label 28C and the identifier 28D are combined into a single data byte, with the first nibble of the data byte carrying the label 28C and the second nibble of the data byte carrying the identifier 28D. It will be understood that the identifiers and labels can be stored in other ways.

The table shown in FIG. 6 (or FIGS. 3D, 5) may be stored as a list of data elements. In FIG. 6 the list is: 63 01 02 06 71 04 81 07 91 08 A0 B3 01 02 03 C1 04 D1 07 E1 08 F0. This order allows the data corresponding to contactless transactions to be parsed more quickly, as the transaction time for contactless transactions is more critical than contact transactions.

When an operating mode is detected based on acquired biometrics, the correspondence data 28 is parsed to find an entry corresponding to the operating mode and the interface used (PPSE, PSE). As explained above, in the example of FIG. 6 a label corresponding to the operating mode and interface is determined (PPSE label=mode+5; PSE label=mode+10). A look-up is performed in the correspondence data using the label. Once the corresponding label is found, the corresponding number of indexes is parsed until the last one. If the index for the corresponding interface in use is not found, the platform (or the application) rejects the selection.

Examples have been described in which the card supports a Payment System Environment (PSE) and a Proximity Payment System Environment (PPSE). The table of FIG. 3D has two columns corresponding to PSE and PPSE. In other examples, the card may only support PSE or PPSE. The table shown in FIGS. 3D, 5 or 6 may be simplified to a single column.

The use of correspondence data avoids the need for a link between the mode number and the order in which the response data 26A, 26B is stored. This allows all personalisation to be restricted to data stored in the secure element.

Figure 7A:
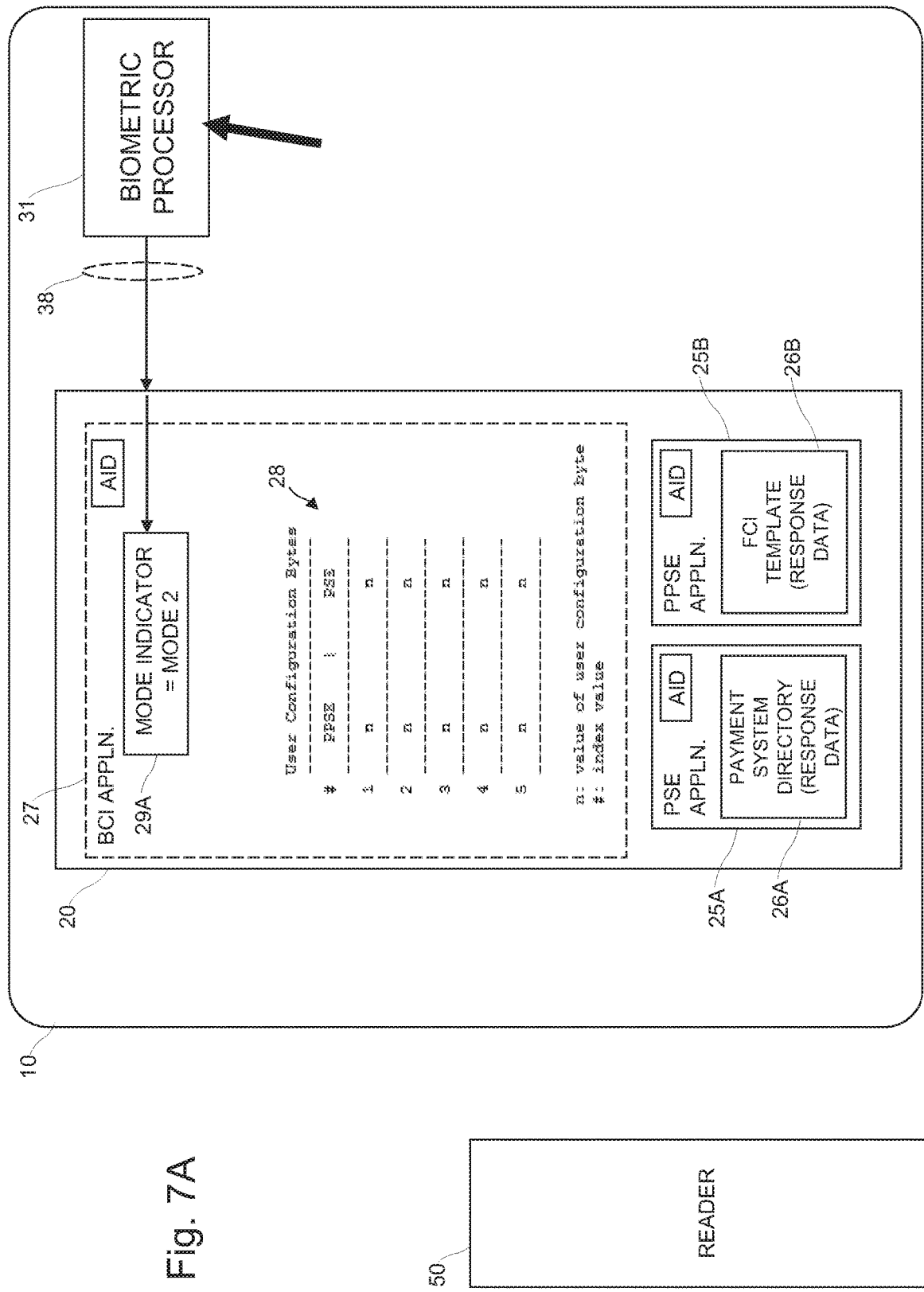
FIGS. 7A and 7B show operation of the card.
Figure 7B:
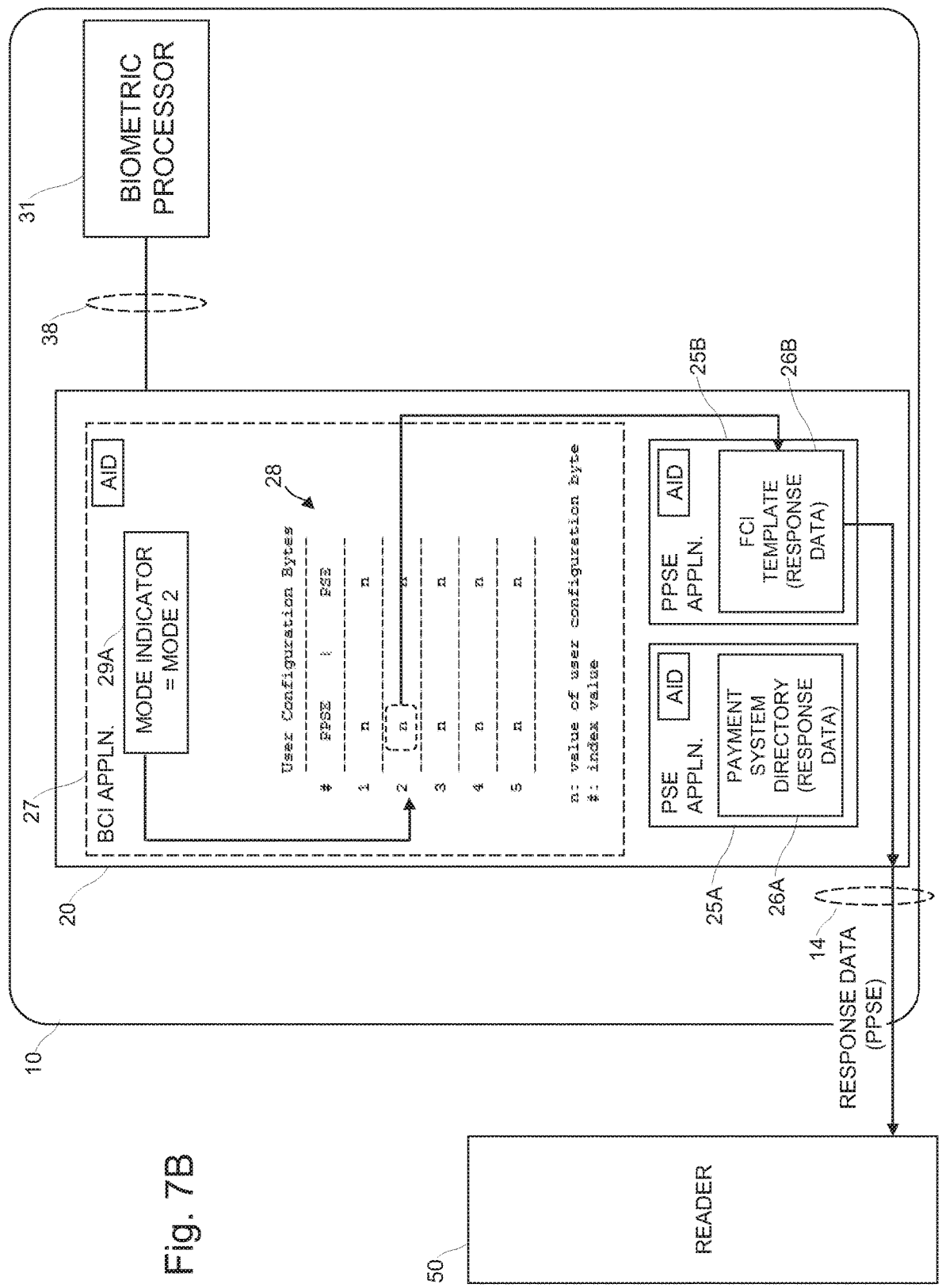

For completeness, FIGS. 7A and 7B show an overview of the mode selection process. FIG. 7A shows the initial selection of an operating mode. In this example, an operating mode 2 is selected by operating the biometric interface, i.e. by acquiring biometrics. The biometric interface processor 31 signals to the secure element 20, via the internal interface 38, that mode 2 has been selected. The biometric interface processor 31 can send an APDU with the AID of the BCI Application 27. The secure element 20 stores an indication 29A that operating mode 2 was selected. Operating mode 2 corresponds to application instance 2 supported by the card, such as an instance of a debit application or of some other application that is dedicated to the identified user or that the user wishes to use by having acquired biometrics of one specific user part.

FIG. 7B shows a subsequent communication between a reader 50 and the card. In this example, it is assumed that a contactless reader interrogates the card via a contactless external interface 14. The communication exchange detailed in FIG. 3A occurs. When the secure element 20 is asked to supply details of the application instances it supports, the secure element 20 responds with details of the application instance provided by the current operating mode (=application 2). This occurs by performing a look up in the table 28 of correspondence data, using the operating mode (2) as an index in the table 28. An entry in the table 28 at row 2 and column PPSE indicates a value n. Value n is used as an index to select a template (a set of response data 28B) to send in the response to the card reader 50. For the example of FIG. 5, mode 2 under PPSE corresponds to the second application template (n=2) in response data 26B, which stores AID=5. In this way, the card reader 50 only receives details of the application instance (with AID=5), and does not receive details of other application instances. Therefore, the card reader is prevented from automatically selecting an application instance which does not match the selected operating mode. The selection of the application instance at the card 10 is made without the need to exchange any secure data between the secure element 20 and the biometric interface section 30 of the card. Personalisation of the card can be performed in a conventional manner, by using the external interfaces 12, 14 between the secure element 20 and the reader 50. No personalisation of the card may be performed via the internal interface 38 between the secure element 20 and the biometric interface section 30.

The biometric interface section 30 of the card 10 may also allow the contactless interface to be turned on or off. As part of the communication between the biometric interface section 30 and the secure element 20, the biometric interface section 30 may receive data (biometrics) which indicates whether the contactless interface should be turned on/off. A response from the functional block 27 can include a byte of data which indicates, for each operating mode, whether the contactless interface should be turned on or off. For example, each bit position of this byte can represent an operating mode (bit 1=mode 1, bit 2=mode 2, etc.) and the value of the bit can indicate if the contactless interface is to be turned on or off (e.g. bit="1" means contactless interface is switched on, bit="0" means contactless interface is switched off.

FIG. 1 shows a card 10 with a secure element 20 and a biometric interface section 30 embedded within the card 10. In another possible example, the secure element is hosted by an electronic device, such as a smart phone. The biometric interface section can be provided by biometric interface functionality of the host device. The functionality of the biometric interface may be provided by a processor which performs other tasks for the host device, rather than a dedicated biometric interface processor 31 as shown in FIG. 1. The biometric interface of the host device allows biometrics to be acquired from one or more users in order to select operating modes for the secure element. In a similar way to described above, the biometric interface section of the host device can communicate to the secure element an indication of an operating mode associated with the biometrics acquired from the user. Operation of the secure element is the same as described above.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A card (10) for hosting a plurality of application instances (23), the card (10) comprising:
   a first external interface (12, 14) configured to receive, from an external card reader (50), an application selection command that selects one application instance from a set of one or more selectable application instances (23);
   one of a second external interface (12,14) and an internal biometric interface (30a), said one of a second external interface and an internal biometric interface (30a) being configured to acquire biometric data; and
   a processor (21, 31) configured to carry out a biometric data comparison that compares the acquired biometric data to reference biometric data stored in the card, and to set the selectable application instance set depending on an outcome of the biometric data comparison,
   wherein the selectable application instance set comprises an instance of an application configured with personalized parameters,
   wherein the personalized parameters depend on the outcome of the biometric data comparison, and
   wherein the personalized parameters are selected from one of the following sets:
      when the outcome of the biometric data comparison is a negative biometric data comparison, requesting a personal code from a user to perform a function of the application instance, and not requesting said personal code when the outcome of the biometric data comparison is a positive biometric data comparison; and
      when the outcome of the biometric data comparison is a negative biometric data comparison, restricting a function of the application instance, and not restricting said function of the application instance when the outcome of the biometric data comparison is a positive biometric data comparison.

2. The card of claim 1, wherein, when the outcome of the biometric data comparison is a positive biometric data comparison, the selectable application instance set comprises an instance of a non-biometric application.

3. The card of claim 1, wherein the application is instantiated with the personalized parameters in response to one of the biometric data comparison and the application selection command reception.

4. The card of claim 2, wherein, when the outcome of the biometric data comparison is a positive biometric data comparison, the selectable application instance set comprises an instance of a biometric application.

5. The card of claim 1, wherein the processor, for comparing the acquired biometric data to reference biometric data, compares the acquired biometric data to a plurality of reference biometric data sets, each set of said reference biometric data sets being associated with a predefined selectable application instance set for selection as the selectable application instance set depending on the outcome of the biometric data comparison.

6. The card of claim 5, wherein the plurality of reference biometric data sets correspond to a respective plurality of users, or to a respective plurality of biometric parts of the same user, or to a respective plurality of biometric parts of each of two or more users.

7. The card of claim 5, wherein the processor is configured to obtain an indication of one reference biometric data set matching the acquired biometric data, and to store the obtained one reference biometric data set indication in a memory.

8. The card of claim 7, wherein the processor is configured to allow and disallow the selection of application instances by the application selection command based on the indication of the matching one reference biometric data set and the predefined selectable application instance sets.

9. The card of claim 1, wherein the processor is configured to store the outcome of the biometric data comparison or the acquired biometric data for use during execution of the selected application instance.

10. The card of claim 1, wherein the processor is configured to send, responsive to receiving an interrogation by the external card reader, a list of application identifiers assigned to the application instances of the selectable application instance set.

11. A method of operating a card that hosts a plurality of application instances (23), the method comprising:
receiving, from an external card reader (50), an application selection command that selects one application instance from a set of one or more selectable application instances (23);
acquiring biometric data, from one of an external interface and an internal biometric interface (30a); and
comparing the acquired biometric data to reference biometric data stored in the card,
wherein the selectable application instance set is set depending on an outcome of the comparing step,
wherein the selectable application instance set comprises an instance of an application configured with personalized parameters,
wherein the personalized parameters for configuration depend on the outcome of the biometric data comparison, and
wherein the personalized parameters are selected from one of the following sets:
when the outcome of the biometric data comparison is a negative biometric data comparison, requesting a personal code from a user to perform a function of the application instance, and not requesting said personal code when the outcome of the biometric data comparison is a positive biometric data comparison; and
when the outcome of the biometric data comparison is a negative biometric data comparison, restricting a function of the application instance, and not restricting said function of the application instance when the outcome of the biometric data comparison is a positive biometric data comparison.

12. The method of claim 11, wherein, when the output of the comparing step is a positive biometric data comparison, the selectable application instance set comprises an instance of a non-biometric application.

13. The card of claim 2, wherein the processor, for comparing the acquired biometric data to reference biometric data, compares the acquired biometric data to a plurality of reference biometric data sets, each set of said reference biometric data sets being associated with a predefined selectable application instance set for selection as the selectable application instance set depending on the outcome of the biometric data comparison.

* * * * *